US012608855B2

(12) United States Patent
Wang et al.

(10) Patent No.: US 12,608,855 B2
(45) Date of Patent: Apr. 21, 2026

(54) VIDEO GENERATION METHOD AND APPARATUS, DEVICE AND READABLE STORAGE MEDIUM

(71) Applicant: Beijing Zitiao Network Technology Co., Ltd., Beijing (CN)

(72) Inventors: Xu Wang, Beijing (CN); Kai Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 260 days.

(21) Appl. No.: 18/264,232

(22) PCT Filed: Jan. 29, 2022

(86) PCT No.: PCT/CN2022/075037
§ 371 (c)(1),
(2) Date: Aug. 3, 2023

(87) PCT Pub. No.: WO2022/166896
PCT Pub. Date: Aug. 11, 2022

(65) Prior Publication Data
US 2024/0095981 A1    Mar. 21, 2024

(30) Foreign Application Priority Data

Feb. 5, 2021    (CN) .......................... 202110163139.8

(51) Int. Cl.
*G06T 11/20*        (2006.01)
*G06T 5/70*         (2024.01)
(Continued)

(52) U.S. Cl.
CPC .............. *G06T 11/203* (2013.01); *G06T 5/70* (2024.01); *G06T 11/001* (2013.01); *G06T 13/80* (2013.01);
(Continued)

(58) Field of Classification Search
CPC ....... G06T 11/203; G06T 5/70; G06T 11/001; G06T 13/80; G06T 2207/30201;
(Continued)

(56) References Cited

U.S. PATENT DOCUMENTS

| | | | | |
|---|---|---|---|---|
| 6,021,417 A | * | 2/2000 | Massarksy ............ | G06T 11/001 |
| | | | | 715/846 |
| 2006/0227133 A1 | * | 10/2006 | Petrov .................... | G06V 10/10 |
| | | | | 345/419 |

(Continued)

FOREIGN PATENT DOCUMENTS

| | | |
|---|---|---|
| CN | 102496180 A | 6/2012 |
| CN | 107967667 A | 4/2018 |

(Continued)

OTHER PUBLICATIONS

China National Intellectual Property Administration, Notice of Allowance in Application No. 202110163139.8, Dec. 28, 2022, 4 pages.

(Continued)

*Primary Examiner* — Sheree N Brown
(74) *Attorney, Agent, or Firm* — Alleman Hall LLP

(57)        ABSTRACT

A video generation method is provided. After a source image is acquired by an electronic device, sketch images of different stages in a process of simulating a painter to draw a target sketch are generated based on the source image in an order of color from light to dark, and a plurality of subgraphs in the process of simulating the painter to draw the sketch image are generated in an order of drawing completion degrees from low to high. Then, respective subgraphs of respective sketch images in the plurality of sketch images are taken as video frames of a sketch drawing video, an order
(Continued)

of the video frames is set according to the order of color depth from light to dark and the order of drawing completion degrees from low to high.

18 Claims, 8 Drawing Sheets

(51) Int. Cl.

| | |
|---|---|
| *G06T 11/00* | (2006.01) |
| *G06T 13/80* | (2011.01) |
| *G06V 40/16* | (2022.01) |

(52) U.S. Cl.
CPC .. *G06V 40/171* (2022.01); *G06T 2207/30201* (2013.01); *G06T 2210/12* (2013.01)

(58) Field of Classification Search
CPC  G06T 2210/12; G06V 40/171; G11B 27/031; H04N 2005/2726; H04N 5/2625; H04N 5/262; H04N 5/265
USPC ......................................................... 345/589
See application file for complete search history.

(56) References Cited

U.S. PATENT DOCUMENTS

| | | | |
|---|---|---|---|
| 2007/0154110 A1* | 7/2007 | Wen ........................ | G06T 15/02 |
| | | | 382/173 |
| 2010/0254594 A1 | 10/2010 | Wang et al. | |
| 2012/0169759 A1* | 7/2012 | Patil ...................... | G06T 11/203 |
| | | | 345/441 |
| 2014/0219634 A1* | 8/2014 | McIntosh .............. | G06F 3/0484 |
| | | | 386/278 |
| 2016/0104309 A1* | 4/2016 | Kim ........................ | G06T 17/20 |
| | | | 382/118 |
| 2016/0353080 A1* | 12/2016 | Nguyen ................ | H04N 13/271 |
| 2020/0105028 A1* | 4/2020 | Gao ........................... | G06T 5/77 |
| 2021/0357113 A1* | 11/2021 | Mangu ...................... | G06T 9/20 |

FOREIGN PATENT DOCUMENTS

| | | | |
|---|---|---|---|
| CN | 109087553 | A | 12/2018 |
| CN | 109448079 | A | 3/2019 |
| CN | 109993810 | A | 7/2019 |
| CN | 110599437 | A | 12/2019 |
| CN | 110717919 | A | 1/2020 |
| CN | 110738595 | A | 1/2020 |
| CN | 112995534 | A | 6/2021 |
| EP | 0916994 | A2 | 5/1999 |
| EP | 0932120 | A2 | 7/1999 |
| JP | H11224329 | A | 8/1999 |
| JP | 3114587 | U | 10/2005 |
| JP | 2011248727 | A | 12/2011 |
| JP | 2013098925 | A | 5/2013 |
| JP | 7615337 | B2 | 1/2025 |
| KR | 1020150034058 | A | 4/2015 |

OTHER PUBLICATIONS

China National Intellectual Property Administration, Office Action and Search Report Issued in Application No. 202110163139.8, Jun. 22, 2022, 18 pages.
China National Intellectual Property Administration, International Search Report and Written Opinion Issued in Application No. PCT/CN2022/075037, Apr. 20, 2022, WIPO, 13 pages.
Examination Report for Indian Application No. 202327052480, mailed May 6, 2025, 7 pages.
European Patent Office, Extended European Search Report Issued in Application No. 22749175.0, Jun. 24, 2024, 10 pages.
Japan Patent Office, Office Action Issued in Application No. 2023-547370, Jun. 18, 2024, 6 pages.
Xue, T. et al., "Robot portrait rendering based on multi-features fusion method inspired by human painting," Proceedings of the International Conference on Robotics and Biomimetics, Dec. 5, 2017, Macau, 6 pages.
Intellectual Property Office of Singapore, Office Action and Search Report Issued in Application No. 11202305881X, Feb. 10, 2026, 9 pages.

* cited by examiner

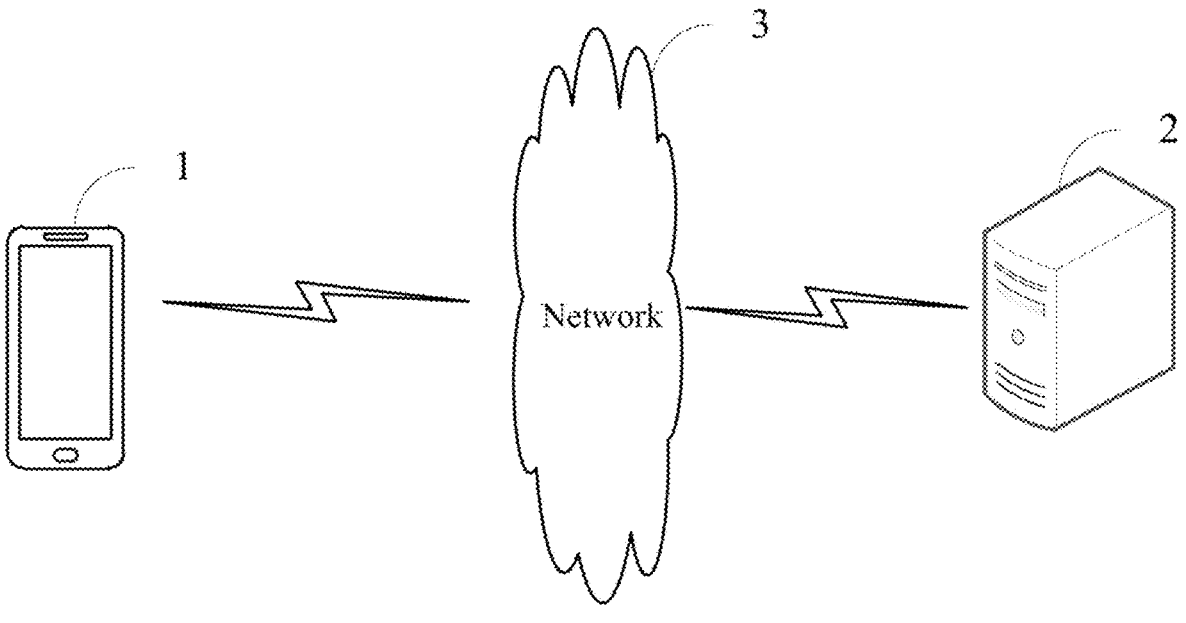

FIG. 1

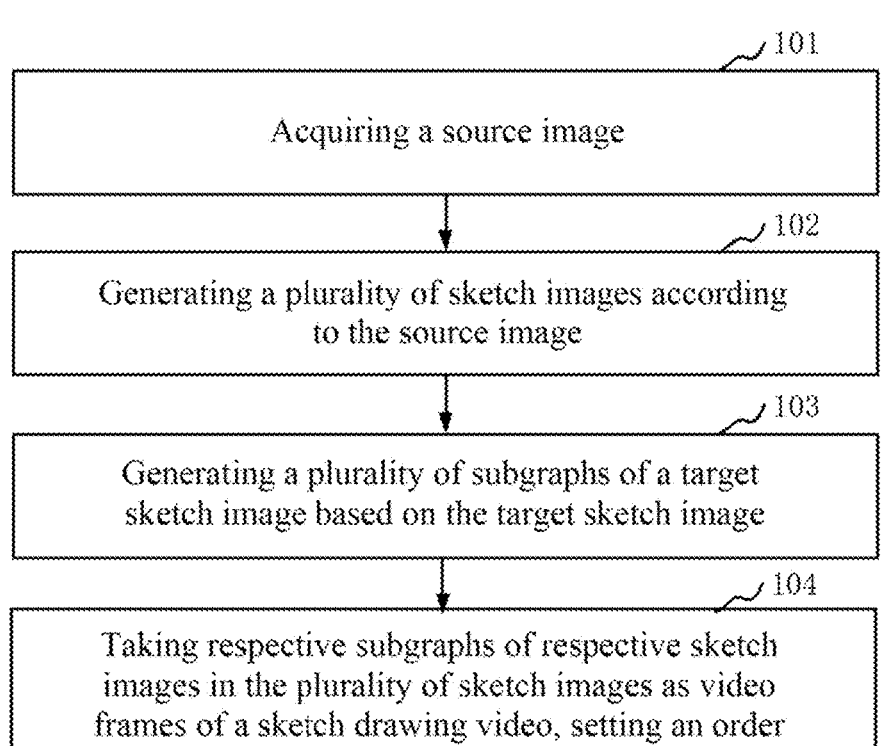

101

Acquiring a source image

102

Generating a plurality of sketch images according to the source image

103

Generating a plurality of subgraphs of a target sketch image based on the target sketch image

104

Taking respective subgraphs of respective sketch images in the plurality of sketch images as video frames of a sketch drawing video, setting an order of the video frames according to an order of color depth from light to dark and an order of drawing completion degrees from low to high, and generating the sketch drawing video

FIG. 2

Key points of the source image

Degree of completion from low to high

......

1

VIDEO GENERATION METHOD AND APPARATUS, DEVICE AND READABLE STORAGE MEDIUM

CROSS-REFERENCE TO RELATED APPLICATION

The present application is a National Stage of International Application No. PCT/CN2022/075037, filed on Jan. 29, 2022, which claims priority to Chinese Patent Application No. 202110163139.8, titled "VIDEO GENERATION METHOD AND APPARATUS, DEVICE AND READABLE STORAGE MEDIUM", filed to China National Intellectual Property Administration on Feb. 5, 2021, both of the above applications are incorporated herein by reference in their entireties.

TECHNICAL FIELD

Embodiments of the present disclosure relate to the technical field of image processing and, in particular, to a video generation method and apparatus, a device and a readable storage medium.

BACKGROUND

Sketch is a kind of image stylization. Sketch in real life is an artistic form that uses pencil as a medium and expresses scenery or characters with lines. Sketch can be classified as two types: line structure painting and fine realistic sketch. Handmade sketches require an author to possess certain artistic skills.

With the intelligence of terminal devices, users can get sketch images by using the terminal devices. In a process of acquiring a sketch image, the terminal device performs style conversion processing on a source image selected by the users, thus obtaining a sketch image. With the development of video, users are no longer satisfied with acquiring static images, but expect to acquire a dynamic video to simulate the process of painting by artists and draw the sketch image step by step.

However, most of the existing videos are real videos recorded as artists with artistic skills painting on the spot, which is difficult for ordinary users and basically impossible for them to achieve.

SUMMARY

Embodiments of the present disclosure provide a video generation method and apparatus, a device, and a readable storage medium. Based on an image, a video simulating a painter creating a sketch image step by step is generated, and the process is simple.

In a first aspect, an embodiment of the present disclosure provides a video generation method, including:

acquiring a source image;

generating a plurality of sketch images according to the source image, where the plurality of sketch images respectively correspond to sketch images of the source image at different color depths;

generating a plurality of subgraphs of a target sketch image based on the target sketch image, where the plurality of subgraphs respectively correspond to sketch images of the target sketch image at different drawing completion degrees, and the target sketch image is any sketch image of the plurality of sketch images; and

taking respective subgraphs of respective sketch images in the plurality of sketch images as video frames of a sketch drawing video, setting an order of video frames according to an order of color depth from light to dark and an order of drawing completion degrees from low to high, and generating the sketch drawing video.

In a second aspect, the present disclosure provides a video generation apparatus, including:

an acquisition unit, configured to acquire a source image;

a first generation unit, configured to generate a plurality of sketch images according to the source image, where the plurality of sketch images respectively correspond to sketch images of the source image at different color depths;

a second generation unit, configured to generate a plurality of subgraphs of a target sketch image based on the target sketch image, where the plurality of subgraphs respectively correspond to sketch images of the target sketch image at different drawing completion degrees, and the target sketch image is any sketch image of the plurality of sketch images; and a third generation unit, configured to take respective subgraphs of respective sketch images in the plurality of sketch images as video frames of a sketch drawing video, set an order of the video frames according to an order of color depth from light to dark and an order of drawing completion degrees from low to high, and generate the sketch drawing video.

In a third aspect, according to one or more embodiments of the present disclosure, an electronic device is provided, where the electronic device includes: at least one processor and a memory;

the memory stores computer executable instructions; and the at least one processor executes the computer executable instructions stored in the memory, enables the at least one processor executes the video generation method as described in the first aspect and various possible designs of the first aspect.

In a fourth aspect, according to one or more embodiments of the present disclosure, a computer readable storage medium is provided, where the computer readable storage medium stores computer executable instructions, and when the computer executable instructions are executed by a processor, the video generation method as described in the first aspect and various possible designs of the first aspect is implemented.

In a fifth aspect, an embodiment of the present disclosure provides a computer program product, which includes: a computer program stored in a readable storage medium, and at least one processor of an electronic device reads the computer program from the readable storage medium, and the at least one processor executes the computer program to enable the electronic device to implement the video generation method as described in the first aspect and various possible designs of the first aspect.

In a sixth aspect, an embodiment of the present disclosure provides a computer program which, when executed by a processor, the video generation method as described in the first aspect and various possible designs of the first aspect is implemented.

According to the video generation method and apparatus, the device and the readable storage medium provided by embodiments of the present disclosure, after an electronic device acquires a source image, sketch images of different stages in a process of simulating a painter drawing a target sketch are generated based on the source image in an order of color from light to dark, and for each target sketch image, a plurality of subgraphs in the process of simulating the painter drawing the sketch image are generated in an order of drawing completion degrees from low to high, Then respective subgraphs of respective sketch images in the plurality of sketch images is taken as video frames of a sketch drawing video, and an order of the video frames is set according to an order of color depth from light to dark and an order of drawing completion degrees from low to high, so as to generate the sketch drawing video. In this process, each stage of the artist creating sketch images is simulated through image processing, the process is simple and efficient with no need for deep learning process.

BRIEF DESCRIPTION OF DRAWINGS

In order to explain the embodiments of the present disclosure or the technical scheme in the related art more clearly, drawings needed in the description of the embodiments or the related art will be briefly introduced below. Obviously, the drawings in the following description are some embodiments of the present disclosure, and for those skilled in the art, other drawings can be obtained according to these drawings without creative labor.

FIG. 1 is a schematic diagram of network architecture for a video generation method provided by an embodiment of the present disclosure.

FIG. 2 is a flowchart of a video generation method provided by an embodiment of the present application.

DESCRIPTION OF EMBODIMENTS

Figure 3:
FIG. 3 is a schematic diagram of a plurality of sketch images provided by an embodiment of the present disclosure.

In order to make the purpose, technical scheme and advantages of the embodiments of the disclosure more clear, the technical scheme in the embodiments of the disclosure will be described clearly and completely with reference to the accompanying drawings in the embodiments of the disclosure. Obviously, the described embodiments are a part of the embodiments of the disclosure, but not all of the embodiments. Based on the embodiments in the present disclosure, all other embodiments obtained by those skilled in the art without creative labor falls to the protection scope of the present disclosure.

At present, many short videos about drawing process of pencil sketch are very popular among users, these kinds of videos are obtained by shooting the process of professional artists creating pencil sketch on the spot. Obviously, the above-mentioned method of shooting and recording short videos on the spot is not applicable to ordinary users as ordinary users have no artistic skills.

Therefore, the present disclosure generates a video that simulates a step-by-step drawing process of a painter based on a source image and a target sketch, the process of which is simple and meets the needs of ordinary users.

FIG. 1 is a schematic diagram of network architecture for a video generation method provided by an embodiment of the present disclosure. Referring to FIG. 1, the network architecture includes a terminal device 1, a server 2 and a network 3. The terminal device 1 and the server 2 establish a network connection through the network 3. The network 3 includes various network connection types, such as wired communication links, wireless communication links or optical fiber cables, and so on.

A user uses the terminal device 1 to interact with the server 2 through the network 3 to receive or send messages and the like. Various communication client applications are installed on the terminal device 1, such as video playing applications, shopping applications, search applications, instant messaging tools, email clients, social platform software, and so on.

The terminal device 1 can be hardware or software. When the terminal device 1 is hardware, the terminal device 1 is, for example, a mobile phone, a tablet computer, an e-book reader, a laptop computer, a desktop computer, and the like. When the terminal device 1 is software, it can be installed in the hardware devices listed above. At this time, the terminal device 1 is, for example, a plurality of software modules or a single software module, which is not limited by the embodiments of the present disclosure.

The server 2 is a server that can provide a variety of services, and is used to receive a source image sent by the terminal device, and generate a video simulating a painter creating a sketch image step by step based on the source image.

The server 2 can be hardware or software. When the server 2 is hardware, the server 2 is a single server or a distributed server cluster composed of multiple servers. When the server 2 is software, it can be a plurality of software modules or a single software module, which is not limited by the embodiments of the present disclosure.

It should be understood that number of the terminal device 1, the server 2 and the network 3 in FIG. 1 is only schematic. In actual implementation, any number of the electronic device 1, the server 2 and the network 3 are deployed according to actual requirements.

In addition, when the video generation method of the present disclosure is executed by the terminal device 1, the server 2 and the network 3 in the above-mentioned FIG. 1 may not exist since networking is not required.

In the following, the video generation method described in the embodiments of the present application will be described in detail based on the network architecture shown in FIG. 1. For example, please refer to FIG. 2.

FIG. 2 is a flowchart of a video generation method provided by an embodiment of the present application. The execution body of this embodiment is an electronic device, such as the terminal device or server in FIG. 1. This embodiment includes the following steps.

101, acquiring a source image.

5

Illustratively, the electronic device acquires the source image locally, or acquires the source image from the Internet. The source image is also referred to as (image src). The source image is a red green blue (RGB) image, a black-and-white photo, etc., which is not limited by the embodiments of the present disclosure.

102, generating a plurality of sketch images according to the source image.

The plurality of sketch images respectively correspond to sketch images of the source image at different color depths.

For example, the process of creating sketch images by professional painters is a step-by-step process, and the visual feeling of a whole work is that colors are from light to dark. In this step, the electronic device generates a plurality of sketch images according to the source image, and the colors of these sketch images are deepened in turn. For example, please refer to FIG. 3.

FIG. 3 is a schematic diagram of a plurality of sketch images provided by an embodiment of the present disclosure. Please refer to FIG. 3, the leftmost is the source image, which can be a colored RGB image or a black-and-white photo, etc., and ①-④ are different sketch images. In the actual creation process, the actual creation process of a work is from ① to ④. Therefore, the electronic device uses image processing algorithm to process the source image, thus acquiring sketch images ①-④ based on the source image. Among them, the sketch image ④ is, for example, a final product, which is equivalent to a finished work created by a professional painter.

It should be noted that the above-mentioned sketch images ①-④ only show different sketch images illustratively, and do not necessarily mean that there are four sketch images. In an actual implementation, the number of the sketch images with color from light to dark can be less than or greater than 4.

103, generating a plurality of subgraphs of a target sketch image based on the target sketch image.

The plurality of subgraphs respectively correspond to sketch images of the target sketch image at different drawing completion degrees, and the target sketch image is any sketch image of the plurality of sketch images.

For example, for any sketch image among the above-mentioned plurality of sketch images, hereinafter referred to as the target sketch image, when being created by a professional painter, it is impossible to complete the target sketch image in one stroke, instead, it is completed step by step for many times. In order to simulate this process, the electronic device generates sketch images with different drawing completion degrees for the target sketch image, which is hereinafter referred to as subgraphs. For adjacent first subgraph and second subgraph, the second subgraph contains more stroke areas than the first subgraph. For example, if the drawing completion degrees indicate that a mouth is drawn first and then eyes are drawn, then the first subgraph includes a drawn mouth, and the second subgraph includes drawn eyes in addition to the drawn mouth.

In addition, even the same part may require multiple strokes to complete drawing. For example, the first subgraph contains a drawn mouth contour, and the second subgraph contains not only the drawn mouth contour, but also the filling of the mouth.

Figure 4:
FIG. 4 is a schematic diagram of a plurality of subgraphs provided by an embodiment of the present disclosure.

In the following, taking a face contour as an example, several subgraphs are similarly illustrated. For example, please refer to FIG. 4. FIG. 4 is a schematic diagram of several subgraphs provided by an embodiment of the present disclosure.

Please refer to FIG. 4, assuming that the length of a video is 15 seconds, with 30 frames per second, then 450 images are included. 30 frames of the 450 frame of image are used to draw the face contour, which is equivalent to 30 subgraphs, and the 30 frame of image is equivalent to simulating the completion of the face contour by 30 strokes of a professional painter. Stroke areas in the plurality of subgraphs increase. The stroke area is the face contour. As shown in FIG. 4, among the 30 frames of images, the face contour in the first frame is the least, and the face contour in the second frame gradually increases. By the 30th frame of images, the whole face contour is drawn.

104, Taking respective subgraphs of respective sketch images in the plurality of sketch images as video frames of a sketch drawing video, setting an order of the video frames according to an order of color depth from light to dark and an order of drawing completion degrees from low to high, and generating the sketch drawing video.

For example, after the electronic device generates subgraphs for respective sketch images in the plurality of sketch images, all subgraphs are taken as video frames. Then, the order of each subgraph of the target sketch image is set according to the order of drawing completion degrees from low to high, so as to obtain the sub-video simulating the creation of the target sketch image, and then the order of each sub-video is set according to the order of color from light to dark, and these sub-videos are synthesized, so as to obtain the sketch drawing video.

When the electronic device is a server, the electronic device sends the sketch drawing video to mobile terminals such as mobile phones for the mobile terminals such as mobile phones to play the sketch drawing video. Or, when the electronic device is a mobile terminal such as a mobile phone, the sketch video is directly played or the sketch drawing video is stored locally.

According to the video generation method provided by embodiment of the present disclosure, after an electronic device acquires a source image, sketch images of different stages in a process of simulating a painter drawing a target sketch are generated based on the source image in an order of color from light to dark, and for each target sketch image, a plurality of subgraphs in the process of simulating the painter drawing the sketch image are generated in an order of drawing completion degrees from low to high, Then respective subgraphs of respective sketch images in the plurality of sketch images is taken as video frames of a sketch drawing video, and an order of the video frames is set according to an order of color depth from light to dark and an order of drawing completion degrees from low to high, so as to generate the sketch drawing video. In this process, each stage of an artist creating sketch images is simulated through image processing, the process is simple and efficient with no need for deep learning process.

In the above embodiment, when the electronic device generates a plurality of subgraphs of a target sketch image based on the target sketch image, an increase order of mask values of pixels in a first mask is determined, where initial mask values of the pixels in the first mask is 0, an increase of the pixels in the first mask is used to indicate that the mask values of the pixels is changed from 0 to 1, and the first mask is used for gradually transforming a background of the target sketch image into the target sketch image according to the increase order. Then, the plurality of subgraphs is generated according to the increase order, the target sketch image and the background of the target sketch image, where each increase in the increase order and a subgraph in the plurality of subgraphs are in a one-to-one correspondence.

For example, for any sketch image of a plurality of sketch images, hereinafter referred to as the target sketch image, a first mask is set for the target sketch image by the electronic device, and initial mask values of the pixels in the first mask are all 0. Then, the electronic device determines the increase order of the pixels in the first mask, and the increase order is used to indicate mask values of which pixels change from 0 to 1, and each increase corresponds to one or more strokes in the painting process of a professional painter. For example, a certain increase indicates that the mask values of pixel points of upper lip contour changes from 0 to 1, then the upper lip contour can be drawn according to this increase.

By using this scheme, the purpose of accurately simulating the drawing of the sketch image by the painter is realized by generating subgraphs at different stages in the process of drawing pencil sketch.

In the above embodiment, when the electronic device generates the plurality of subgraphs according to the increase order, the target sketch image and the background of the target sketch image, first, for each increase in the increase order, a first pixel set corresponding to the increase is determined from the first mask.

For example, among the plurality of sketch images with color from light to dark, for two adjacent sketch images, in a real creation process, a latter sketch image is actually obtained by drawing on the basis of a previous sketch image.

Therefore, the process of creating a target sketch image is actually a process of drawing on the background of the target sketch image, so that the background is transformed into the target sketch image. In order to realize this process, it is necessary to control the change of mask values of pixels in the first mask. For example, at the beginning, the mask value of each pixel in the first mask is 0, and at this time, the background is not changed. In each increase process, the electronic device determines the first pixel set from the first mask according to the increase. For example, for certain increase, the mask values of the pixels representing the upper lip contour in the first mask change to 1, then, the pixels representing the upper lip contour is taken as the first pixel set.

Then, according to the first pixel set, a second pixel set is determined from the target sketch image, and a third pixel set is determined from the background, a pixel in the first pixel set, a pixel in the second pixel set and a pixel in the third pixel set are in a one-to-one correspondence.

For example, the pixels of the target sketch image, the pixels of the first mask and the pixels of the background are in a one-to-one correspondence, therefore, the electronic device can determine the second pixel set from the target sketch image and determine the third pixel set from the background after determining the first pixel set from the first mask.

Then, the electronic device determines the pixel value of a fourth pixel according to a mask value of the first pixel in the first pixel set, a pixel value of a second pixel in the second pixel set and a pixel value of a third pixel in the third pixel set, where the pixel value of the fourth pixel=the mask value of the first pixel×the pixel value of the second pixel+the pixel value of the third pixel×(1−the mask value of the first pixel). Updating the third pixel in the background with the fourth pixels to obtain the subgraph corresponding to the increase.

Figure 5:
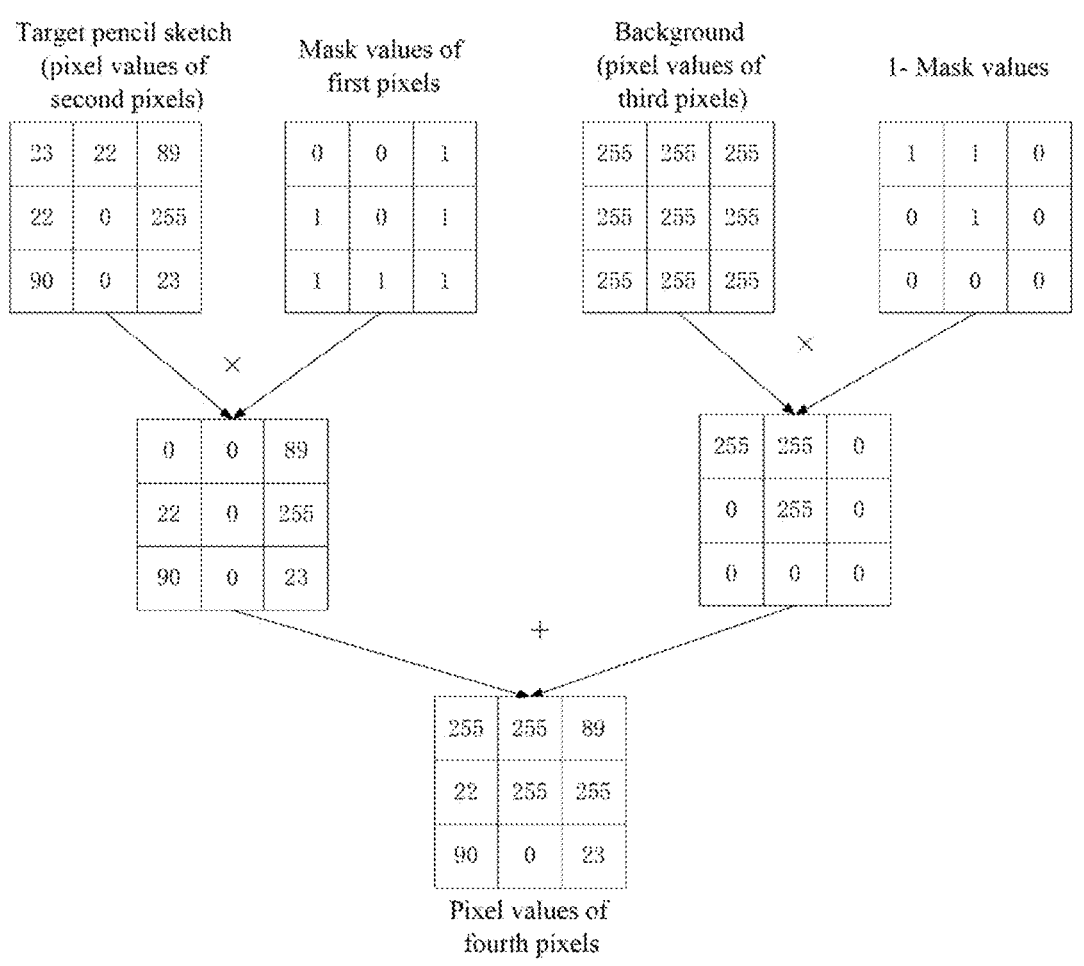
FIG. 5 is a schematic diagram of a process of drawing a subgraph in the video generation method provided by the present disclosure.

For example, please refer to FIG. 5, which is a schematic diagram of the process of drawing subgraphs in the video generation method provided by the present disclosure. Please refer to FIG. 5. The pixel value of each pixel on the background is 255, that is, the background is a pure white background. Assuming that the pixels corresponding to a certain increase of the first mask are six pixels with a mask value of 1, a polyline containing the six pixels is finally drawn on the background, and the gray values of the six pixels are 90, 0, 23, 23, 255 and 89 respectively.

By using this scheme, the process of drawing each subgraph on the background is simulated, and the purpose of accurately simulating the drawing of sketch images by the painter is realized.

In the above embodiment, when the target sketch image is not a lightest sketch image among the plurality of sketch images, the background is a sketch image adjacent to and located in front of the target sketch image among the plurality of sketch images; when the target sketch image is a lightest sketch image among the plurality of sketch images, the background is a white image with the same size as the target sketch image.

For example, please refer to FIG. 3 again, sketch image ② is obtained by drawing on sketch image ① continuously, and sketch image ③ is obtained on the basis of the sketch image ②. The sketch image ① is actually drawn on a white background. That is to say, the background of the sketch image ① is a white background with pixel value of each pixel of the white background equals to 255, and the background of the sketch image ② is the sketch image ①, and so on.

Using this scheme, the sketch images in different stages correspond to different backgrounds, and the purpose of accurately simulating the drawing of sketch images by the painter is realized.

In the above embodiment, each increase in the increase order of the first mask corresponds to a subgraph in a plurality of subgraphs one by one, and the increase order includes the increase order of the face contour of a person in the source image. When the source image contains a person, and when the electronic device determines the increase order of the mask values of the pixels in the first mask, firstly, key points of a face in the source image are extracted to obtain a key point set. Then, the electronic device determines a second mask of a hair area of the person in the source image according to the source image. Then, the electronic device determines a first convex hull area of the face of the person according to the key points set; determines a second convex hull area from the second mask according to the intersection of the first convex hull area and the second mask. In the end, the electronic device obtains the increase order of the face contour of the person in the source image by sequentially connecting the key points of the face contour in the key point set on the second convex hull area according to a stroke speed, where the stroke speed is determined according to a duration of the video.

Figure 6:
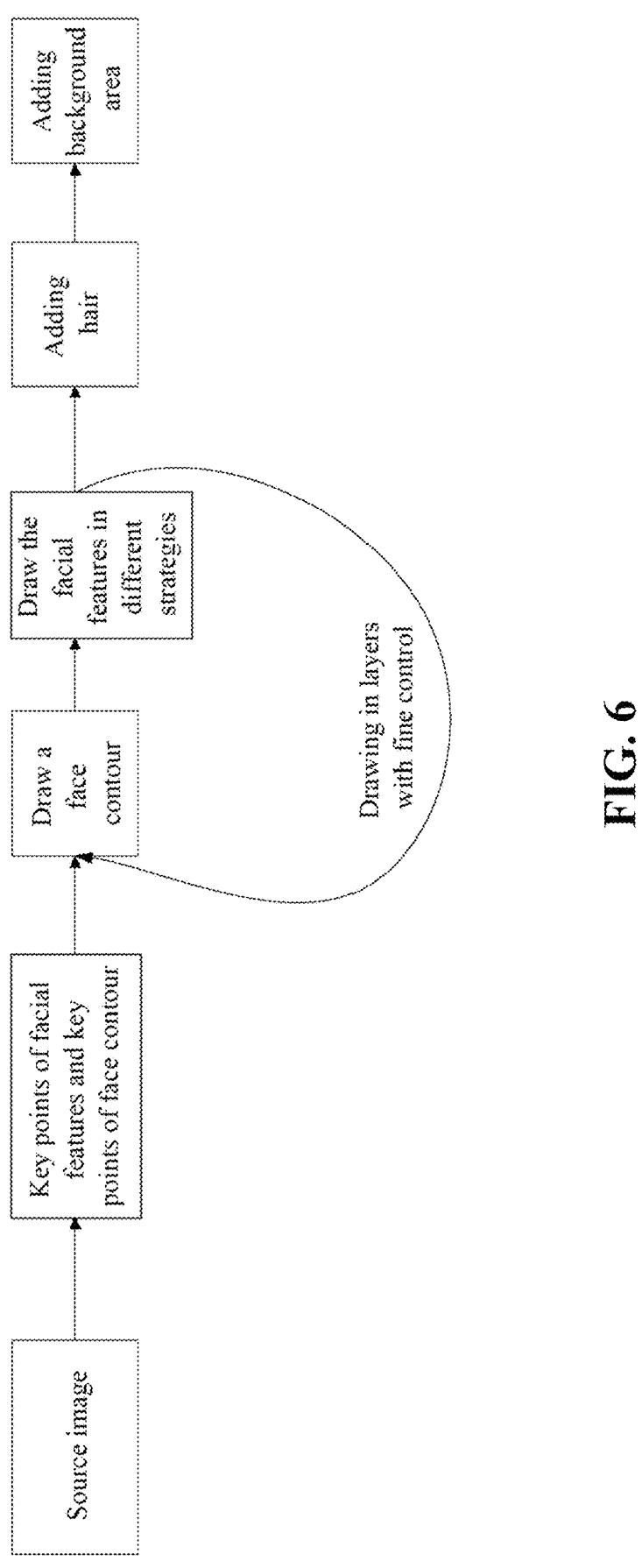
FIG. 6 is a schematic diagram of a process of the video generation method provided by the present disclosure.

For example, please refer to FIG. 6, which is a process schematic diagram of the video generation method provided by the present disclosure. Please refer to FIG. 6, after acquiring the source image, the electronic device extracts the key points of the facial features and the key points of the face contour by using a detection model for key points of the face, and determines the second mask of the hair area of the person by using a hair segmentation model.

Figure 7:
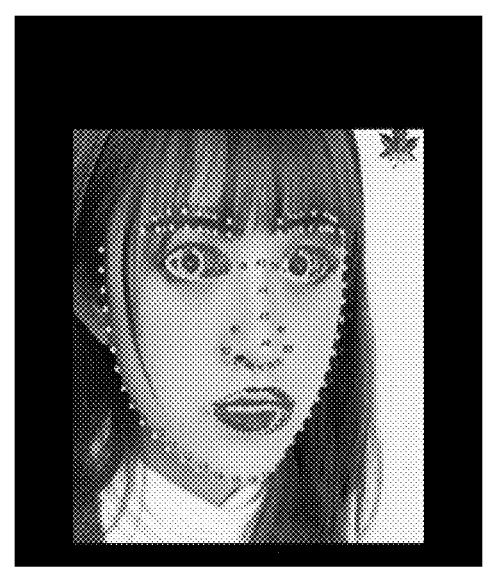
FIG. 7 is a schematic diagram of key points of a face in the video generation method provided by the present disclosure.

FIG. 7 is a schematic diagram of key points of the face in the video generation method provided by the present disclosure. Please refer to FIG. 7, key points of the face include 7 parts of key points of a left eyebrow, a right eyebrow, a left eye, a right eye, a nose, a mouth and a face contour. Numbers next to the key points in the figure represent a sequence numbers of the key points. For example, there are 34 key points in the face contour, and the key points represented by sequence numbers 1-34 are the key points of the face contour.

Figure 8:
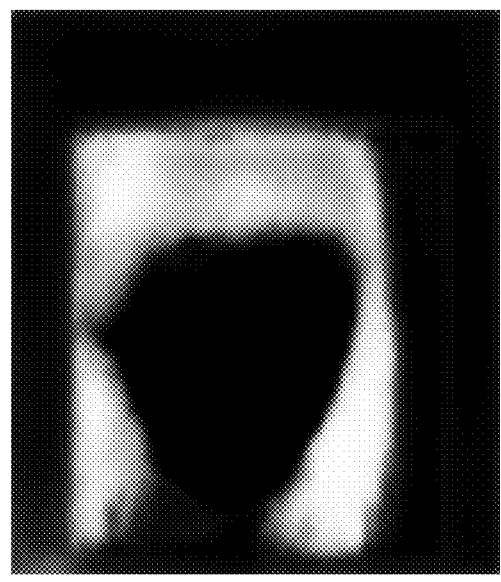
FIG. 8 is a schematic diagram of a second mask of a hair area in the video generation method provided by the present disclosure.

FIG. 8 is a schematic diagram of the second mask of the hair area in the video generation method provided by the present disclosure. Please refer to FIG. 8, the function of the second mask of the hair area is to avoid the problem of disorder in the simulation of drawing process. For example, in an actual drawing, the face contour is drawn first, then the eyebrows are drawn, then the eyes are drawn, and finally the hair is added, instead of the hair appearing first. Therefore, using the second mask can block the hair area and avoid the hair appearing first in the simulation of drawing process, which leads to an unnatural simulation process.

When drawing the face contour, the increase order of the face contour in the first mask should be determined first. In the determination process, the electronic device determines the first convex hull area from the first mask according to the key point set. For example, the electronic device will connect the key points of the face contour, the key points of the left eyebrow and the key points of the right eyebrow in order, and the first convex hull area can be obtained. After that, the electronic device determines an intersection of the first convex hull area and the second mask shown in FIG. 8, and then a second convex hull area can be determined.

Figure 9:
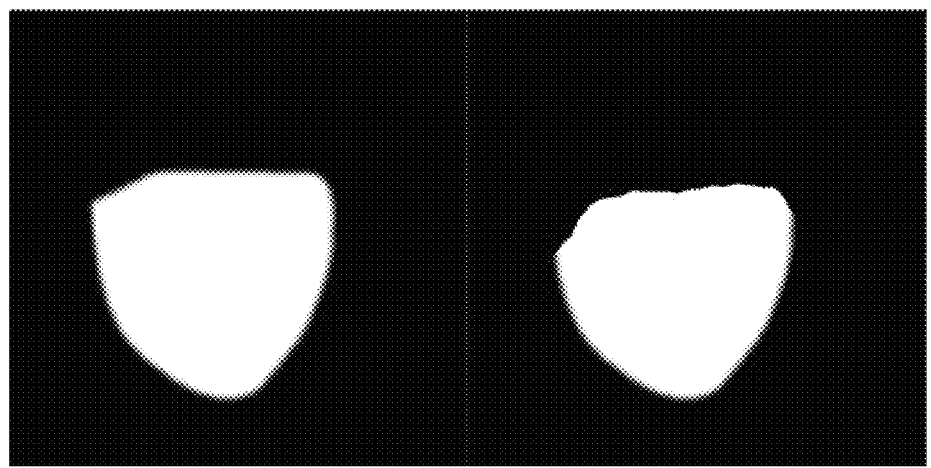
FIG. 9 is a schematic diagram of a first convex hull area and a second convex hull area in the video generation method provided by the present disclosure.

FIG. 9 is a schematic diagram of a first convex hull area and a second convex hull area in the video generation method provided by the present disclosure. Please refer to FIG. 9, as there is a hair-covered area in the first convex hull area, in order to avoid the problem of hair appearing first in the simulation of drawing process, it is necessary to remove the hair-covered area in the first convex hull area to obtain the second convex hull area. The position of the face can be determined from the background according to the second convex hull area. Next, the face contour, facial features and so on are needed to be drawn in the position of the face in the background. Then, the areas other than the hair and the person are drawn, so that the target sketch image appears step by step in the background, thus simulating the process of drawing the target sketch image.

The process of drawing the face contour is actually a process in which the mask value of pixels representing face contour in the first mask changes from 0 to 1 in turn, that is, the increase process of pixels representing face contour in the first mask. The increase process includes an increase order and a stroke speed. The increase order is a process of connecting the key points of the face contour in turn, for example, connecting the key points of face contour from the 1st key point to the 34th key point in turn, so as to obtain the increase order of the face contour. The increase rate is determined according to a length of the video. For example, if a 450-frame video wants to draw the face contour in three strokes, it is equivalent to that the first mask increases three times in the process of drawing the face contour, and each time about 11 pixels increases. From a visual point of view, it is equivalent to simulating the drawing of the face contour by a painter in three strokes, which corresponding to three subgraphs, that is, three image frames. For another example, to draw the face contour in one second, it is equivalent to the first mask increasing 30 times, which is equivalent to simulating the process of a painter drawing the face contour in 30 strokes.

After the face contour is drawn, the mask values positioned in the face contour on the first mask is 1. In the subsequent process of drawing the facial features, the mask values of the face contour continue to remain 1.

Using this scheme, the process of drawing face contour by the artist can be accurately simulated.

Please refer to FIG. 6 again, after the electronic device determines the increase order of the face contour, it is also needed to determine the increase order of each area of the facial features. In the determination process, the electronic device determines the key points of different areas of the face from the key point set; interpolating each area of the face according to the key points of each area; according to the interpolated area, determines the increase order of the corresponding areas in the face of the person in the source image based on the stroke speed on the second convex hull area.

For example, the face contour is relatively simple, and the polylines obtained by connecting the key points of the face in turn can represent the face contour. However, for the area of facial features, the image obtained by connecting the key points of the facial features area in turn cannot meet the requirements of the realistic sketch image. For example, please refer to FIG. 7, after the two rows of key points on the left eyebrow are connected in turn, there is a blank part in the middle, which obviously cannot meet the requirements of the sketch image. Moreover, it is obviously unreasonable to connect the key points in each row in turn to form an effect that the left eyebrow is drawn with two strokes. Therefore, it is far from enough to connect the key points in turn for the areas of facial features. At this time, it is necessary to interpolate different areas of the facial features in different ways. According to the interpolated areas, the increase order corresponding to the facial features areas is determined in the area of the second convex hull in the background according to the stroke speed, so as to prepare for the subsequent strategy drawing of the facial features areas.

Using this scheme, different interpolation algorithms are used for different areas of facial features, and the process of drawing facial features by artists is accurately simulated.

In the above embodiment, when the electronic device interpolates different areas of the face according to the key points of the area, for the eyebrow area in the face, a plurality of curves are interpolated transversely according to the key points of the eyebrow area.

For example, please refer to FIG. 7 again, taking the left eyebrow area as an example, the key points of the left eyebrow include two rows of key points, and the key points of an upper row correspond to the key points of the bottom row one by one. For each group of key points, the electronic device determines an average value, thus interpolating the key points of the left eyebrow area into three rows of key points. Further, the electronic device can also interpolate the key points in the left eyebrow area into 4 or 5 rows, which is not limited by the embodiment of the present disclosure, and the number of rows is related to accuracy. After interpolation, it takes seven or eight strokes to draw the left eyebrow, which can simulate the drawing process of the painter in a more reasonable way.

For the eyeball area in the face area, according to the key points of the eyeball area, the eyeball area is interpolated according to a circular area.

For example, as the eyeball is round, the pupil cannot be drawn with horizontal lines. Therefore, for the eyeball area, a circular interpolation method is used. First, a circle representing the eyeball is drawn, and then smaller circles are interpolated until a solid circle is formed. In the process of interpolation, an average value of center of the eyeball and the points on the circumference is determined, the average value is taken as a radius, and a circle is interpolated with the center of the eyeball as a center. From the perspective of the first mask, when the first mask increases, the image formed by pixels of each increase is not a polyline, but one or more circles.

For the mouth area in the face area, a plurality of curves are interpolated vertically according to the key points of the mouth area.

For example, the key points in the mouth area can only draw the mouth contour, and after the mouth contour is completed, it is interpolated according to vertical lines as filling. From the perspective of the first mask, after the first mask completes the increase of the mouth contour, for the lip part, the image formed by pixels of each increase are vertical lines.

Using this scheme, the process of drawing the facial features by the painter is accurately simulated by using different interpolation algorithms for the facial features.

In the above embodiment, after the electronic device draws the face contour and the facial features, the last few frames of images are used to add hair and the background areas other the person. For example, in a video of 450 frames, 90 frames are used to generate the sketch image ① in FIG. 3. Among the 90 frames, the first 88 frames are used to draw facial contours and facial features, the 89th frame is used to add hair, and the 90th frame is used to add background areas other than the person.

In the above embodiment, when the electronic device generates a plurality of sketch images based on the source images, firstly, a gray image is generated based on the source image. Then, the electronic device determines a plurality of Gaussian kernels, where the Gaussian kernels in the plurality of Gaussian kernels correspond to the sketch images in the plurality of sketch images one by one, and the size of a Gaussian kernel corresponding to a sketch image with darker color is larger than a Gaussian kernel corresponding to a sketch image with lighter color. Then, according to the plurality of Gaussian kernels, the electronic device respectively carries out Gaussian blur on the gray image to obtain a Gaussian blur image corresponding to a respective Gaussian kernel in the plurality of Gaussian kernels. Finally, the electronic device generates the plurality of sketch images according to the Gaussian blur image corresponding to the respective Gaussian kernel in the Gaussian kernels and the gray image.

For example, after the electronic device acquires the source image, it performs noise reduction processing such as median filtering on the source image. After that, the electronic device performs gray processing on each pixel of the source image, thereby converting the source image into a gray image. After obtaining the gray image, the electronic device determines the Gaussian kernels corresponding to Gaussian blur according to Gaussian convolution, and performs the Gaussian blur on the gray image with this Gaussian kernel to obtain a Gaussian blur image. The larger the size of Gaussian kernel, the color of Gaussian blurred image obtained by Gaussian blur on gray image using the Gaussian kernel is darker.

After obtaining the Gaussian blur image corresponding to a respective sketch image in a plurality of sketch images, the electronic device takes the Gaussian blur image and the gray image as materials to generate a black-and-white sketch image. For example, the electronic device fuses the pixels in the Gaussian blur image and the corresponding pixels in the gray image, thus generating a sketch image. In the process of fusion, size of the source image, gray image, Gaussian blur image and sketch image are the same, and the pixels of the source image, gray image, Gaussian blur image and sketch image have a one-to-one correspondence. Therefore, the electronic device can determine pixel values of the corresponding pixels in the black-and-white sketch image according to the pixel values of the pixels in the gray image and the Gaussian blur image, and obtain sketch image. For example, after generating a Gaussian blur image, the electronic device performs effect extraction with a dodge mode, that is, performs extraction with the following Formula (1):

$$\text{image\_target} = (\text{image\_gray}/\text{gray\_blur}) \times 255 \qquad \text{Formula (1)}$$

The image_target represents the pixel values of the pixels in the sketch image, image_gray represents the pixel values of the pixels in the gray image, and gray_blur1 represents the pixel values of the pixels in the Gaussian blur image.

Using this scheme, sketch images with different levels are obtained based on dodge of different Gaussian kernels.

Figure 10:
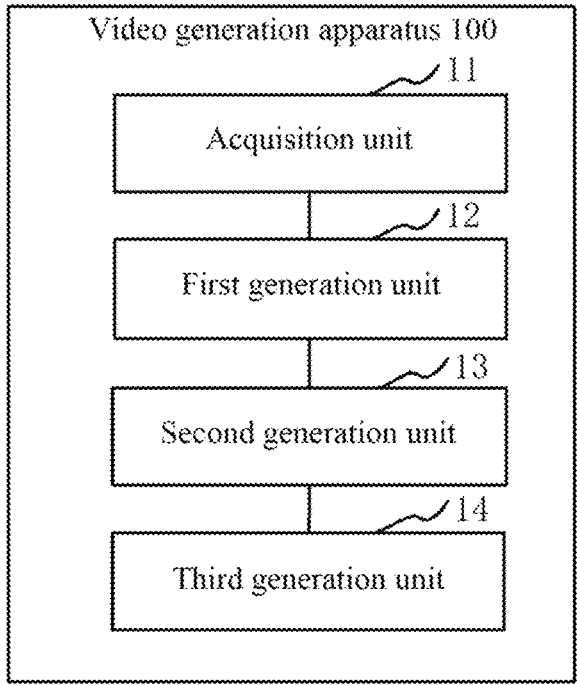
FIG. 10 is a structural block diagram of a video generation apparatus provided by an embodiment of the present disclosure.

Corresponding to the video generation method of the above embodiments, FIG. 10 is a structural block diagram of a video generation apparatus provided by the embodiment of the present disclosure. For convenience of explanation, only parts related to the embodiments of the present disclosure are shown. Please refer to FIG. 10, the device includes an acquisition unit 11, a first generation unit 12, a second generation unit 13 and a third generation unit 14.

The acquisition unit 11 is configured to acquire a source image.

The first generation unit 12 is configured to generate a plurality of sketch images according to the source image, where the plurality of sketch images respectively correspond to sketch images of the source image at different color depths.

The second generation unit 13 is configured to generate a plurality of subgraphs of a target sketch image based on the target sketch image, where the plurality of subgraphs respectively correspond to sketch images of the target sketch image at different drawing completion degrees, and the target sketch image is any sketch image of the plurality of sketch images;

The third generation unit 14 is configured to take respective subgraphs of respective sketch images in the plurality of sketch images as video frames of a sketch drawing video, set an order of the video frames according to an order of color depth from light to dark and an order of drawing completion degrees from low to high, and generate the sketch drawing video.

In an embodiment of the present disclosure, the second generation unit 13 is configured to determine an increase order of mask values of pixels in a first mask, where initial mask values of the pixels in the first mask are 0, an increase of the pixels in the first mask is used to indicate that the mask values of the pixels is changed from 0 to 1, and the first mask is used for gradually transforming a background of the target sketch image into the target sketch image according to the increase order; and generate the plurality of subgraphs according to the increase order, the target sketch image and the background of the target sketch image, where each increase in the increase order and a subgraph in the plurality of subgraphs are in a one-to-one correspondence.

In an embodiment of the present disclosure, when generating the plurality of subgraphs according to the increase order, the target sketch image and the background of the target sketch image, the second generation unit 13 is configured to, for each increase in the increase order, determine a first pixel set corresponding to the increase from the first mask; determine a second pixel set from the target sketch image and a third pixel set from the background according to the first pixel set, where a pixel in the first pixel set, a pixel in the second pixel set and a pixel in the third pixel set are in a one-to-one correspondence; determine a pixel value of a fourth pixel according to a mask value of a first pixel in the first pixel set, a pixel value of a second pixel in the second pixel set and a pixel value of a third pixel in the third pixel set, where the pixel value of the fourth pixel=the mask value of the first pixel×the pixel value of the second pixel+the pixel value of the third pixel×(1−the mask value of the first pixel); and update the third pixel in the background with the fourth pixel to obtain a subgraph corresponding to the increase.

In one embodiment of the present disclosure, when the target sketch image is not the lightest sketch image among the plurality of sketch images, the background is a sketch image adjacent to and located in front of the target sketch image among the plurality of sketch images; when the target sketch image is the lightest sketch image among the plurality of sketch images, the background is a white image with the same size as the target sketch image.

In an embodiment of the present disclosure, the source image contains a person, and the increase order includes the increase order of the face contours of the person in the source image. When determining the increase order of the mask values of the pixels in the first mask, the second generation unit 13 is configured to extract the key points of a face in the source image to obtain a key point set; determine a second mask of a hair area of the person in the source image according to the source image; determine a first convex hull area of the face of the person according to the set of key points; determine a second convex hull area from the second mask according to an intersection of the first convex hull area and the second mask; and obtain the increase order of the face contour of the person in the source image by sequentially connecting the key points of the face contour in the key point set on the second convex hull area according to a stroke speed, where the stroke speed is determined according to the duration of the video.

In an embodiment of the present disclosure, after obtaining the increase order of the face contour of the person in the source image by sequentially connecting the key points of the face contour in the key point set on the second convex hull area according to the stroke speed, the second generation unit 13 is further configured to determine the key points of different areas of the face from the key point set; interpolate a respective area of the face according to a key point of the respective area; and determine, according to the interpolated area, the increase order of a corresponding area in the face of the person in the source image based on the stroke speed on the second convex hull area.

In an embodiment of the present disclosure, when interpolating different areas of the face according to the key points of the areas, the second generation unit 13 transversely interpolates a plurality of curves according to a key point of the eyebrow area for an eyebrow area in the face; for an eyeball area in the face area, according to a key point of the eyeball area, interpolates the eyeball area according to a circular area; and for a mouth area in the face area, vertically interpolates a plurality of curves according to a key point of the mouth area.

In an embodiment of the present disclosure, the first generation unit 12 is configured to generate a gray image based on the source image; determine a plurality of Gaussian kernels, where Gaussian kernels in the plurality of Gaussian kernels correspond to a sketch images in the plurality of sketch images one by one, and a size of the Gaussian kernel corresponding to a sketch image with darker color is larger than a size of the Gaussian kernel corresponding to the sketch image with lighter color; perform Gaussian blur on the gray image respectively according to the plurality of Gaussian kernels, to obtain a Gaussian blur image corresponding to a respective Gaussian kernel in the plurality of Gaussian kernels; and generate the plurality of sketch images according to the Gaussian blur image corresponding to the respective Gaussian kernel in the plurality of Gaussian kernels and the gray image.

The apparatus provided in this embodiment can be used to implement the technical scheme of the above method embodiment, and the implementation principles and technical effects therebetween are similar, which are not repeated here.

Figure 11:
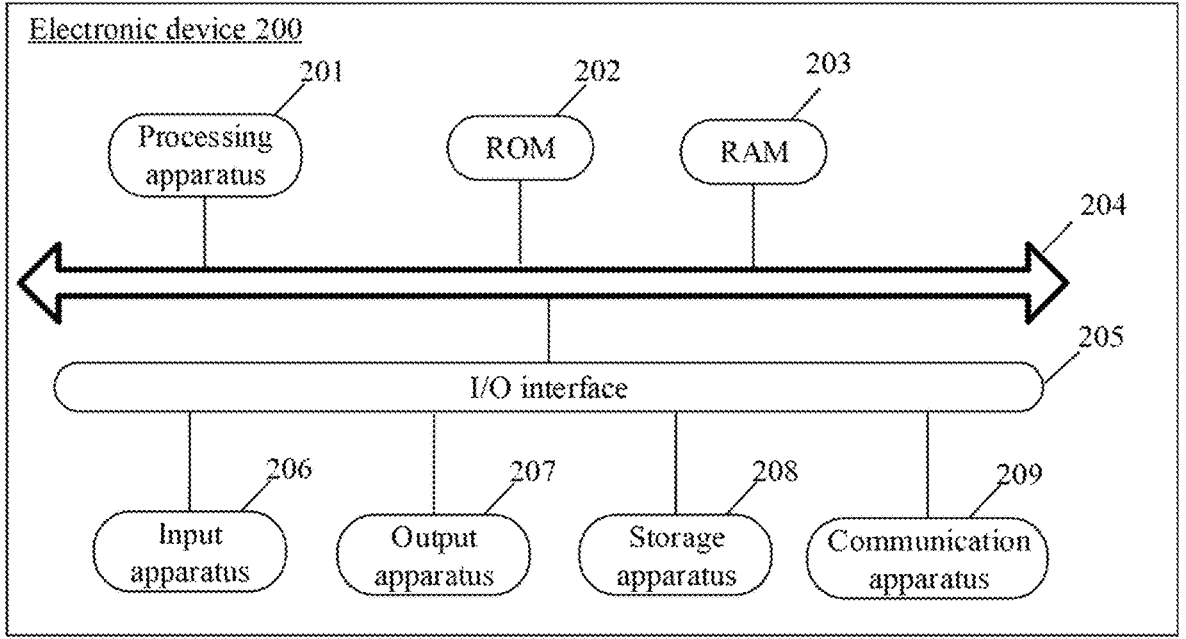
FIG. 11 is a schematic structural diagram of an electronic device used to implement the embodiments of the present disclosure.

FIG. 11 is a schematic structural diagram of an electronic device used to implement the embodiments of the present disclosure. The electronic device 200 may be a terminal device or a server. Among them, the terminal device may include, but is not limited to, mobile terminals such as mobile phones, notebook computers, digital broadcast receivers, personal digital assistant (PDA for short), portable android device (PAD for short), portable media player (PMP for short), vehicle-mounted terminals (such as vehicle-mounted navigation terminals) and fixed terminals such as digital TVs and desktop computers. The electronic device shown in FIG. 11 is just an example, and should not bring any limitation to the function and application scope of the embodiments of the present disclosure.

As shown in FIG. 11, an electronic device 200 may include a processing apparatus (such as a central processing unit, a graphics processor, etc.) 201, which may perform various appropriate actions and processes according to a program stored in a read only memory (ROM for short) 202 or a program loaded from a storage apparatus 208 into a random access memory (RAM for short) 203. In the RAM 203, various programs and data required for the operation of the electronic device 200 are also stored. The processing apparatus 201, the ROM 202 and the RAM 203 are connected to each other through a bus 204. An input/output (I/O for short) interface 205 is also connected to the bus 204.

Generally, the following apparatuses can be connected to the I/O interface 205: an input apparatus 206 including, for example, a touch screen, a touch pad, a keyboard, a mouse, a camera, a microphone, an accelerometer, a gyroscope, etc.; an output apparatus 207 including, for example, a Liquid Crystal Display (LCD), a speaker, a vibrator, etc. a storage apparatus 208 including, for example, a magnetic tape, a hard disk, etc. and a communication apparatus 202. The communication apparatus 202 may allow the electronic device 200 to conduct wireless communication or wired communication with other devices to exchange data. Although FIG. 11 shows the electronic device 200 with various apparatuses, it should be understood that it is not required to implement or have all the apparatuses shown. More or fewer apparatuses may alternatively be implemented or provided.

In particular, according to the embodiments of the present disclosure, the process described above with reference to a flowchart may be implemented as a computer software program. For example, an embodiment of the present disclosure includes a computer program product, which includes a computer program carried on a computer readable medium, and the computer program contains program codes for executing the method shown in the flowchart. In such an embodiment, the computer program may be downloaded and installed from a network through the communication apparatus 202, or installed from the storage apparatus 208, or installed from the ROM 202. When the computer program is executed by the processing apparatus 201, the above-mentioned functions defined in the method of the embodiment of the present disclosure are executed.

It should be noted that, the above-mentioned computer readable medium in the present disclosure may be a computer readable signal medium or a computer readable storage medium or any combination of the both. The computer readable storage medium may be, for example, but not limited to, an electrical, magnetic, optical, electromagnetic, infrared medium, or semiconductor system, apparatus or means, or any combination of the above. More specific examples of the computer readable storage medium may include, but are not limited to: an electrical connection with one or more wires, a portable computer disk, a hard disk, a random access memory (RAM), a read only memory (ROM), an erasable programmable read-only memory (EPROM for short, or a flash memory), an optical fiber, a compact disc read-only memory (CD-ROM for short), an optical storage means, a magnetic storage means, or any suitable combination of the above. In the present disclosure, the computer readable storage medium may be any tangible medium that contains or stores a program, and the program may be used by or in combination with an instruction execution system, apparatus, or device. In the present disclosure, a computer readable signal medium may include a data signal propagated in a baseband or propagated as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable medium other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, Radio Frequency (RF for short), etc., or any suitable combination of the above.

The above-mentioned computer readable medium may be included in the above-mentioned terminal device; or it may exist alone without being assembled into the electronic device.

The above-mentioned computer readable medium carries one or more programs, and when the above-mentioned one or more programs are executed by the electronic device, the electronic device is caused to implement the method shown in the above-mentioned embodiments.

The computer program code used to perform operations of the present disclosure may be written in one or more programming languages or a combination thereof. The above-mentioned programming languages include an object-oriented programming language—such as Java, Smalltalk, C++, and also include a conventional procedural programming language—such as "C" language or similar programming language. The program code may be executed entirely on a computer of a user, partly on a computer of a user, executed as an independent software package, partly executed on a computer of a user and partly executed on a remote computer, or entirely executed on a remote computer or server. In a case where a remote computer is involved, the remote computer may be connected to the computer of the user through any kind of network—including a local area network (Local Area Network, LAN for short) or a wide area network (WAN for short), or, it may be connected to an external computer (for example, connected via the Internet through an Internet service provider).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs designated functions or operations, or may be implemented by a combination of dedicated hardware and computer instructions.

The units involved in the embodiments described in the present disclosure may be implemented in software or hardware. Where a name of a unit does not constitute a limitation on the unit itself in some cases. For example, a first acquiring unit may also be described as "a unit that acquires at least two Internet Protocol addresses".

The functions described above may be performed at least in part by one or more hardware logic components. For example, non-restrictively, exemplary types of hardware logic components that may be used include: a field programmable gate array (FPGA for short), an application specific integrated circuit (ASIC for short), an application specific standard product (ASSP for short), a system on chip (SOC for short), a complex programmable logic device (CPLD for short), etc.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but is not limited to, an electronic, magnetic, optical, electromagnetic, infrared medium, or semiconductor system, apparatus or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

In a first aspect, according to one or more embodiments of the present disclosure, there is provided a video generation method, including: acquiring a source image; generating a plurality of sketch images according to the source image, where the plurality of sketch images respectively correspond to sketch images of the source image at different color depths; generating a plurality of subgraphs of a target sketch image based on the target sketch image, where the plurality of subgraphs respectively correspond to sketch images of the target sketch image at different drawing completion degrees, and the target sketch image is any one of the plurality of sketch images; taking respective sub-graphs of respective sketch images in the plurality of sketch images as video frames of a sketch drawing video, setting an order of the video frames according to the order of color depth from light to dark and the order of drawing completion degrees from low to high, and generating the sketch drawing video.

According to one or more embodiments of the present disclosure, where the generating a plurality of subgraphs of a target sketch image based on the target sketch image includes: determining an increase order of mask values of pixels in a first mask, where an initial mask value of the pixels in the first mask is 0, an increase of the pixels in the first mask is used to indicate that the mask values of the pixels are changed from 0 to 1, and the first mask is used for gradually transforming a background of the target sketch image into the target sketch image according to the increase order; and generating the plurality of subgraphs according to the increase order, the target sketch image and the background of the target sketch image, where each increase in the increase order and a subgraph in the plurality of subgraphs are in a one-to-one correspondence.

According to one or more embodiments of the present disclosure, where the generating the plurality of subgraphs according to the increase order, the target sketch image and the background of the target sketch image includes: for each increase in the increase order, determining a first pixel set corresponding to the increase from the first mask; determining a second pixel set from the target sketch image and a third pixel set from the background according to the first pixel set, where a pixel in the first pixel set, a pixel in the second pixel set and a pixel in the third pixel set are in a one-to-one correspondence; determining a pixel value of a fourth pixel according to a mask value of a first pixel in the first pixel set, a pixel value of a second pixel in the second pixel set and a pixel value of a third pixel in the third pixel set, where the pixel value of the fourth pixel=the mask value of the first pixel×the pixel value of the second pixel+the pixel value of the third pixel×(1−the mask value of the first pixel); and updating the third pixel in the background with the fourth pixel to obtain a subgraph corresponding to the increase.

According to one or more embodiments of the present disclosure, where when the target sketch image is not a lightest sketch image among the plurality of sketch images, the background is a sketch image adjacent to the target sketch image and located in front of the target sketch image among the plurality of sketch images; when the target sketch image is the lightest sketch image among the plurality of sketch images, the background is a white image with a same size as the target sketch image.

According to one or more embodiments of the present disclosure, where the source image contains a person, and the increase order includes an increase order of face contour of the person in the source image, and the determining the increase order of mask values of pixels in the first mask includes: extracting key points of a face in the source image to obtain a key point set; determining a second mask of a hair area of the person in the source image according to the source image; determining a first convex hull area of the face of the person according to the key points set; determining a second convex hull area from the second mask according to an intersection of the first convex hull area and the second mask; and obtaining the increase order of the face contour of the person in the source image by sequentially connecting the key points of the face contour in the key point set on the second convex hull area according to a stroke speed, where the stroke speed is determined according to a duration of the video.

According to one or more embodiments of the present disclosure, where after the obtaining the increase order of the face contour of the person in the source image by sequentially connecting the key points of the face contour in the key point set on the second convex hull area according to the stroke speed, the method further includes: determining key points of different areas of the face from the key point set; interpolating a respective area of the face according to a key point of the respective area; and determining, according to interpolated area, an increase order of a corresponding area in the face of the person in the source image on the second convex hull area according to the stroke speed.

According to one or more embodiments of the present disclosure, where the interpolating different areas of the face according to key points of the areas includes: for an eyebrow area in the face, transversely interpolating a plurality of curves according to a key point of the eyebrow area; for an eyeball area in the face area, according to a key point of the eyeball area, interpolating the eyeball area according to a circular area; and for a mouth area in the face area, vertically interpolating a plurality of curves according to a key point of the mouth area.

According to one or more embodiments of the present disclosure, where the generating the plurality of sketch images according to the source image includes: generating a gray image based on the source image; determining a plurality of Gaussian kernels, where Gaussian kernels in the plurality of Gaussian kernels correspond to a sketch images in the plurality of sketch images one by one, and a size of a Gaussian kernel corresponding to a sketch image with darker color is larger than a size of a Gaussian kernel corresponding to a sketch image with lighter color; perform-ing, according to the plurality of Gaussian kernels, Gaussian blur on the gray image respectively to obtain a Gaussian blur image corresponding to a respective Gaussian kernel in the plurality of Gaussian kernels; and generating the plurality of sketch images according to the Gaussian blur image corre-sponding to the respective Gaussian kernel in the plurality of Gaussian kernels and the gray image.

In a second aspect, according to one or more embodi-ments of the present disclosure, there is provided a video generating apparatus including:

an acquisition unit, configured to acquire a source image;

a first generation unit, configured to generate a plurality of sketch images according to the source image, where the plurality of sketch images respectively correspond to sketch images of the source image at different color depths;

a second generation unit, configured to generate a plural-ity of subgraphs of a target sketch image based on the target sketch image, where the plurality of subgraphs respectively correspond to sketch images of the target sketch image at different drawing completion degrees, and the target sketch image is any sketch image of the plurality of sketch images; and a third generation unit, configured to take respective subgraphs of respective sketch images in the plurality of sketch images as video frames of a sketch drawing video, set an order of the video frames according to an order of color depth from light to dark and an order of drawing completion degrees from low to high, and generate the sketch drawing video.

According to one or more embodiments of the present disclosure, where the second generation unit is configured to determine an increase order of mask values of pixels in a first mask, where initial mask values of the pixels in the first mask are 0, an increase of the pixels in the first mask is used to indicate that the mask values of the pixels are changed from 0 to 1, and the first mask is used for gradually transforming a background of the target sketch image into the target sketch image according to the increase order; and generate the plurality of subgraphs according to the increase order, the target sketch image and the background of the target sketch image, where each increase in the increase order and a subgraph in the plurality of subgraphs are in a one-to-one correspondence.

According to one or more embodiments of the present disclosure, where when generating the plurality of subgraphs according to the increase order, the target sketch image and the background of the target sketch image, the second generation unit is configured to determine a first pixel set corresponding to the increase from the first mask for each increase in the increase order; determine a second pixel set from the target sketch image and a third pixel set from the background according to the first pixel set, where a pixel in the first pixel set, a pixel in the second pixel set and a pixel in the third pixel set are in a one-to-one correspondence; determine a pixel value of a fourth pixel according to a mask value of a first pixel in the first pixel set, a pixel value of a second pixel in the second pixel set and a pixel value of a third pixel in the third pixel set, where the pixel value of the fourth pixel=the mask value of the first pixel×the pixel value of the second pixel+the pixel value of the third pixel×(1−the mask value of the first pixel); and update the third pixel in the background to the fourth pixel to obtain a subgraph corresponding to the increase.

According to one or more embodiments of the present disclosure, where when the target sketch image is not a lightest sketch image among the plurality of sketch images, the background is a sketch image adjacent to the target sketch image and located in front of the target sketch image among the plurality of sketch images; and when the target sketch image is the lightest sketch image among the plurality of sketch images, the background is a white image with a same size as the target sketch image.

According to one or more embodiments of the present disclosure, where the source image contains a person, and the increase order comprises an increase order of face contour of the person in the source image, and when determining an increase order of mask values of pixels in a first mask, the second generation unit is configured to extract key points of a face in the source image to obtain a key point set; determine a second mask of a hair area of the person in the source image according to the source image; determine a first convex hull area of the face of the person according to the key points set; determine a second convex hull area from the second mask according to an intersection of the first convex hull area and the second mask; and obtain the increase order of the face contour of the person in the source image by sequentially connecting the key points of the face contour in the key point set on the second convex hull area according to a stroke speed, where the stroke speed is determined according to a duration of the video.

According to one or more embodiments of the present disclosure, where after obtaining the increase order of the face contour of the person in the source image by sequentially connecting the key points of the face contour in the key point set on the second convex hull area according to the stroke speed, the second generation unit is further configure to determine key points of different areas of the face from the key point set; interpolate a respective area of the face according to a key point of the respective area; and determine, according to interpolated area, an increase order of a corresponding areas in the face of the person in the source image on the second convex hull area according to the stroke speed.

According to one or more embodiments of the present disclosure, where when interpolating different areas of the face according to key points of the areas, the second generation unit transversely interpolates a plurality of curves according to a key point of the eyebrow area for an eyebrow area in the face; for an eyeball area in the face area, according to a key point of the eyeball area, interpolates the eyeball area according to a circular area; and for a mouth area in the face area, vertically interpolates a plurality of curves according to a key point of the mouth area.

According to one or more embodiments of the present disclosure, where the first generation unit is configured to generate a gray image based on the source image;

determine a plurality of Gaussian kernels, where Gaussian kernels in the plurality of Gaussian kernels correspond to a sketch images in the plurality of sketch images one by one, and a size of a Gaussian kernel corresponding to a sketch image with darker color is larger than a size of a Gaussian kernel corresponding to a sketch image with lighter color;

perform, according to the plurality of Gaussian kernels, Gaussian blur on the gray image respectively to obtain a Gaussian blur image corresponding to a respective Gaussian kernel in the plurality of Gaussian kernels; and generate the plurality of sketch images according to the Gaussian blur image corresponding to the respective Gaussian kernel in the plurality of Gaussian kernels and the gray image.

In a third aspect, according to one or more embodiments of the present disclosure, an electronic device is provided, where the electronic device includes: at least one processor and a memory;

the memory stores computer executable instructions; and the at least one processor executes the computer executable instructions stored in the memory, enables the at least one processor to execute the video generation method as described in the first aspect and various possible designs of the first aspect.

In a fourth aspect, according to one or more embodiments of the present disclosure, a computer readable storage medium is provided, where the computer readable storage medium stores computer executable instructions, and when the computer executable instructions are executed by a processor, the video generation method as described in the first aspect and various possible designs of the first aspect is implemented.

In a fifth aspect, according to one or more embodiments of the present disclosure, a computer program product is provided, where the computer program product includes a computer program stored in a readable storage medium, and at least one processor of an electronic device reads the computer program from the readable storage medium, and the at least one processor executes the computer program to cause the electronic device to implement the video generation method as described in the first aspect and various possible designs of the first aspect.

In a sixth aspect, according to one or more embodiments of the present disclosure, a computer program is provided, which, when executed by a processor, implements the video generation method as described in the first aspect and various possible designs of the first aspect.

The above description is only preferred embodiments of the present disclosure and an illustration of the applied technical principles. Those skilled in the art should understand that, the disclosure scope involved in the present disclosure is not limited to the technical solutions formed by the specific combination of the above technical features, but also covers other technical solutions formed by the arbitrary combination of the above technical features or their equivalent features without departing from the above disclosure concept, for example, a technical solution formed by replacing the above features with technical features with similar functions disclosed (but not limited to) in the present disclosure.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in language specific to structural features and/or method logical actions, it should be understood that the subject matter defined in the appended claims is not limited to the specific features or actions described above. On the contrary, the specific features and actions described above are only exemplary forms for implementing the claims.

What is claimed is:

1. A video generation method, comprising:

acquiring a source image;

generating a plurality of sketch images according to the source image, wherein the plurality of sketch images respectively correspond to sketch images of the source image at different color depths;

generating a plurality of subgraphs of a target sketch image based on the target sketch image, wherein the plurality of subgraphs respectively correspond to sketch images of the target sketch image at different drawing completion degrees, and the target sketch image is any one of the plurality of sketch images; and taking respective subgraphs of respective sketch images in the plurality of sketch images as video frames of a sketch drawing video, setting an order of the video frames according to an order of color depth from light to dark and an order of drawing completion degrees from low to high, and generating the sketch drawing video, wherein the generating the plurality of subgraphs of a target sketch image based on the target sketch image comprises:

determining an increase order of mask values of pixels in a first mask, wherein initial mask values of the pixels in the first mask are 0, an increase of the pixels in the first mask is used to indicate that the mask values of the pixels are changed from 0 to 1, and the first mask is used for gradually transforming a background of the target sketch image into the target sketch image according to the increase order; and generating the plurality of subgraphs according to the increase order, the target sketch image and the background of the target sketch image, wherein each increase in the increase order and a subgraph in the plurality of subgraphs are in a one-to-one correspondence.

2. The method according to claim 1, wherein the generating the plurality of subgraphs according to the increase order, the target sketch image and the background of the target sketch image comprises:

for each increase in the increase order, determining a first pixel set corresponding to the increase from the first mask;

determining a second pixel set from the target sketch image and a third pixel set from the background according to the first pixel set, wherein a pixel in the first pixel set, a pixel in the second pixel set and a pixel in the third pixel set are in a one-to-one correspondence;

determining a pixel value of a fourth pixel according to a mask value of a first pixel in the first pixel set, a pixel value of a second pixel in the second pixel set and a pixel value of a third pixel in the third pixel set, wherein the pixel value of the fourth pixel=the mask value of the first pixel×the pixel value of the second pixel+the pixel value of the third pixel×(1−the mask value of the first pixel); and updating the third pixel in the background with the fourth pixel to obtain a subgraph corresponding to the increase.

3. The method according to claim 1, wherein when the target sketch image is not a lightest sketch image among the plurality of sketch images, the background is a sketch image adjacent to the target sketch image and located in front of the target sketch image among the plurality of sketch images; and when the target sketch image is the lightest sketch image among the plurality of sketch images, the background is a white image with a same size as the target sketch image.

4. The method according to claim 1, wherein the source image contains a person, and the increase order comprises an increase order of face contour of the person in the source image, and the determining the increase order of mask values of pixels in the first mask comprises:

extracting key points of a face in the source image to obtain a key point set;

determining a second mask of a hair area of the person in the source image according to the source image;

determining a first convex hull area of the face of the person according to the key points set;

determining a second convex hull area from the second mask according to an intersection of the first convex hull area and the second mask; and obtaining the increase order of the face contour of the person in the source image by sequentially connecting the key points of the face contour in the key point set on the second convex hull area according to a stroke speed, wherein the stroke speed is determined according to a duration of the video.

5. The method according to claim 4, wherein after the obtaining the increase order of the face contour of the person in the source image by sequentially connecting the key points of the face contour in the key point set on the second convex hull area according to the stroke speed, the method further comprises:

determining key points of different areas of the face from the key point set;

interpolating a respective area of the face according to a key point of the respective area; and determining, according to interpolated area, an increase order of a corresponding area in the face of the person in the source image on the second convex hull area according to the stroke speed.

6. The method according to claim 5, wherein the interpolating the respective area of the face according to the key point of the respective area comprises:

for an eyebrow area in the face, transversely interpolating a plurality of curves according to a key point of the eyebrow area;

for an eyeball area in the face, according to a key point of the eyeball area, interpolating the eyeball area according to a circular area; and for a mouth area in the face, vertically interpolating a plurality of curves according to a key point of the mouth area.

7. The method according to claim 1, wherein the generating the plurality of sketch images according to the source image comprises:

generating a gray image based on the source image;

determining a plurality of Gaussian kernels, wherein Gaussian kernels in the plurality of Gaussian kernels correspond to sketch images in the plurality of sketch images one by one, and a size of a Gaussian kernel corresponding to a sketch image with darker color is larger than a size of a Gaussian kernel corresponding to a sketch image with lighter color;

performing, according to the plurality of Gaussian kernels, Gaussian blur on the gray image respectively to obtain a Gaussian blur image corresponding to a respective Gaussian kernel in the plurality of Gaussian kernels; and generating the plurality of sketch images according to the Gaussian blur image corresponding to the respective Gaussian kernel in the plurality of Gaussian kernels and the gray image.

8. A video generating apparatus, comprising:

at least one processor and a memory, wherein the memory stores computer executable instructions, and the at least one processor executes the computer executable instructions stored in the memory to:

acquire a source image;

generate a plurality of sketch images according to the source image, wherein the plurality of sketch images respectively correspond to sketch images of the source image at different color depths;

generate a plurality of subgraphs of a target sketch image based on the target sketch image, wherein the plurality of subgraphs respectively correspond to sketch images of the target sketch image at different drawing completion degrees, and the target sketch image is any sketch image of the plurality of sketch images;

take respective subgraphs of respective sketch images in the plurality of sketch images as video frames of a sketch drawing video, set an order of the video frames according to an order of color depth from light to dark and an order of drawing completion degrees from low to high, and generate the sketch drawing video; and determine an increase order of mask values of pixels in a first mask, wherein initial mask values of the pixels in the first mask are 0, an increase of the pixels in the first mask is used to indicate that the mask values of the pixels are changed from 0 to 1, and the first mask is used for gradually transforming a background of the target sketch image into the target sketch image according to the increase order; and generate the plurality of subgraphs according to the increase order, the target sketch image and the background of the target sketch image, wherein each increase in the increase order and a subgraph in the plurality of subgraphs are in a one-to-one correspondence.

9. A non-transitory computer readable storage medium, wherein the computer readable storage medium stores computer executable instructions, and when the computer executable instructions are executed by a processor, the video generation method according to claim 1 is implemented.

10. The method according to claim 2, wherein when the target sketch image is not a lightest sketch image among the plurality of sketch images, the background is a sketch image adjacent to the target sketch image and located in front of the target sketch image among the plurality of sketch images; and when the target sketch image is the lightest sketch image among the plurality of sketch images, the background is a white image with a same size as the target sketch image.

11. The method according to claim 2, wherein the source image contains a person, and the increase order comprises an increase order of face contour of the person in the source image, and the determining the increase order of mask values of pixels in the first mask comprises:

extracting key points of a face in the source image to obtain a key point set;

determining a second mask of a hair area of the person in the source image according to the source image;

determining a first convex hull area of the face of the person according to the key points set;

determining a second convex hull area from the second mask according to an intersection of the first convex hull area and the second mask; and obtaining the increase order of the face contour of the person in the source image by sequentially connecting the key points of the face contour in the key point set on the second convex hull area according to a stroke speed, wherein the stroke speed is determined according to a duration of the video.

12. The video generating apparatus according to claim 8, wherein when generating the plurality of subgraphs according to the increase order, the target sketch image and the background of the target sketch image, the processor is further configured to:

determine a first pixel set corresponding to the increase from the first mask for each increase in the increase order;

determine a second pixel set from the target sketch image and a third pixel set from the background according to the first pixel set, wherein a pixel in the first pixel set, a pixel in the second pixel set and a pixel in the third pixel set are in a one-to-one correspondence;

determine a pixel value of a fourth pixel according to a mask value of a first pixel in the first pixel set, a pixel value of a second pixel in the second pixel set and a pixel value of a third pixel in the third pixel set, wherein the pixel value of the fourth pixel=the mask value of the first pixel×the pixel value of the second pixel+the pixel value of the third pixel×(1−the mask value of the first pixel); and update the third pixel in the background with the fourth pixel to obtain a subgraph corresponding to the increase.

13. The video generating apparatus according to claim 8, wherein when the target sketch image is not a lightest sketch image among the plurality of sketch images, the background is a sketch image adjacent to the target sketch image and located in front of the target sketch image among the plurality of sketch images; and when the target sketch image is the lightest sketch image among the plurality of sketch images, the background is a white image with a same size as the target sketch image.

14. The video generating apparatus according to claim 12, wherein when the target sketch image is not a lightest sketch image among the plurality of sketch images, the background is a sketch image adjacent to the target sketch image and located in front of the target sketch image among the plurality of sketch images; and when the target sketch image is the lightest sketch image among the plurality of sketch images, the background is a white image with a same size as the target sketch image.

15. The video generating apparatus according to claim 8, wherein the source image contains a person, and the increase order comprises an increase order of face contour of the person in the source image, and when determining the increase order of the mask values of the pixels in the first mask, the processor is further configured to:

extract key points of a face in the source image to obtain a key point set;

determine a second mask of a hair area of the person in the source image according to the source image;

determine a first convex hull area of the face of the person according to the key points set;

determine a second convex hull area from the second mask according to an intersection of the first convex hull area and the second mask; and obtain the increase order of the face contour of the person in the source image by sequentially connecting the key points of the face contour in the key point set on the second convex hull area according to a stroke speed, wherein the stroke speed is determined according to a duration of the video.

16. The video generating apparatus according to claim 15, wherein after obtaining the increase order of the face contour of the person in the source image by sequentially connecting the key points of the face contour in the key point set on the second convex hull area according to the stroke speed, the processor is further configured to:

determine key points of different areas of the face from the key point set;

interpolate a respective area of the face according to a key point of the respective area; and determine, according to interpolated area, an increase order of a corresponding areas in the face of the person in the source image on the second convex hull area according to the stroke speed.

17. The video generating apparatus according to claim 16, wherein when interpolating different areas of the face according to key points of the areas, the processor is further configured to:

for an eyebrow area in the face, transversely interpolates a plurality of curves according to a key point of the eyebrow area;

for an eyeball area in the face, according to a key point of the eyeball area, interpolate the eyeball area according to a circular area; and for a mouth area in the face, vertically interpolate a plurality of curves according to a key point of the mouth area.

18. The video generating apparatus according to claim 8, wherein the processor is further configured to:

generate a gray image based on the source image;

determine a plurality of Gaussian kernels, wherein Gaussian kernels in the plurality of Gaussian kernels correspond to sketch images in the plurality of sketch images one by one, and a size of a Gaussian kernel corresponding to a sketch image with darker color is larger than a size of a Gaussian kernel corresponding to a sketch image with lighter color;

perform, according to the plurality of Gaussian kernels, Gaussian blur on the gray image respectively to obtain a Gaussian blur image corresponding to a respective Gaussian kernel in the plurality of Gaussian kernels; and generate the plurality of sketch images according to the Gaussian blur image corresponding to the respective Gaussian kernel in the plurality of Gaussian kernels and the gray image.

\* \* \* \* \*